UNITED STATES PATENT OFFICE 2,249,911

**CYCLOPENTANOPOLYHYDROPHENAN-
THRENE DERIVATIVES AND PROCESS OF
PRODUCING SAME**

Rupert Oppenauer, Amsterdam, Netherlands, and
Hans Kaegi, Basel, and Karl Miescher, Riehen,
Switzerland, assignors, by mesne assignments,
to Ciba Pharmaceutical Products, Incorporated,
Summit, N. J., a corporation of New Jersey No Drawing. Application May 24, 1938, Serial
No. 209,836. In the Netherlands May 29, 1937

11 Claims. (Cl. 260—397.1)

According to this invention cyclopentanopolyhydrophenanthrene derivatives can be made by causing an $\alpha:\alpha$-dihalogen carboxylic acid derivative of the formula

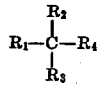

in which $R_1$ and $R_2$ represent halogen, $R_3$ represents hydrogen or a substituted or unsubstituted hydrocarbon residue or carboxyl group and $R_4$ represents a carboxylic acid ester or amide group or a nitrile group, to act in presence of magnesium or a similar bivalent metal on a saturated or unsaturated 17-ketone of the cyclopentanopolyhydrophenanthrene series. The reaction product obtained according to the present process may be treated with a saponifying agent with simultaneous or previous elimination of hydrogen halide or water and the carboxylic acids thus obtained may be decarboxylated. But the halogen atoms may also be replaced before treating the same with saponifying agents by carboxylic acid radicals. Thus 20-oxo compounds of the cyclopentanopolyhydrophenanthrene series are obtained.

Among the saturated and unsaturated 17-ketones of the cyclopentanopolyhydrophenanthrene series serving as parent materials for the invention the following ketones may be named by way of example: androstenolones, such as dehydroandrosterones, androstanolones such as androsterones, oestrones, hexahydro-oestrones, equilins, equilenins, androstenediones, androstanediones, adrenosterone and androstane-17-one and derivatives and stero-isomers of these compounds.

Should the parent material contain free hydroxyl groups these are to be protected by substitution, for example by esterification or etherification. For this purpose the hydroxyl groups may be substituted by, for example, acetyl, propionyl, benzoyl, alkyl, aryl or aralkyl (such as trityl) or similar groups. If in the case of polyketones keto-groups other than that present in 17-position are to be protected before the reaction they are converted into substituted enolgroups (acetate, benzoate, trityl ether, acetals, and the like).

As $\alpha:\alpha$-dihalogen carboxylic acid derivatives there come into consideration for example substituted and unsubstituted esters and amides of dichloracetic acid, dichloro- or dibromo-propionic acid, dichloro-$\beta$-acyloxypropionic acids, $\alpha:\alpha$-dichlorobutyric acid, dichloromalonic acid, dichlorophenylacetic acid, dibromocyanacetic acid and the like, as well as the nitriles corresponding with these acids. As condensing agent there is used magnesium or a similar bivalent metal, advantageously in the form of a dilute amalgam, for example an amalgam of 1 per cent strength. The condensation is advantageously conducted in presence of a solvent. Suitable solvents for this purpose are ethers such as diethyl ether or anisole, hydrocarbons such as benzene, toluene, benzine or the like and also in some cases the $\alpha:\alpha$-dihalogen carboxylic acid derivative used for the reaction itself, for example dichloracetic acid ethyl ester. The reaction may occur at ordinary temperature. Advantageously, however, the reacting mixture is at first cooled somewhat and then gently heated, for example to the boiling point of ethyl ether when this is used as solvent. If required the reaction may be conducted under pressure. An excess of the condensing agent, for example magnesium amalgam, and/or an excess of the dihalogen carboxylic acid derivative is advantageously used for the condensation.

The following scheme illustrates the reactions involved in the present invention taking as examples the condensation of an ester or ether of dehydroandrosterone (I) with a dihalogen acetic acid ester (scheme A) and of an androstene-3:17-dione-3-enol-ester with an $\alpha:\alpha$-dihalogen-propionic acid ester (scheme B):

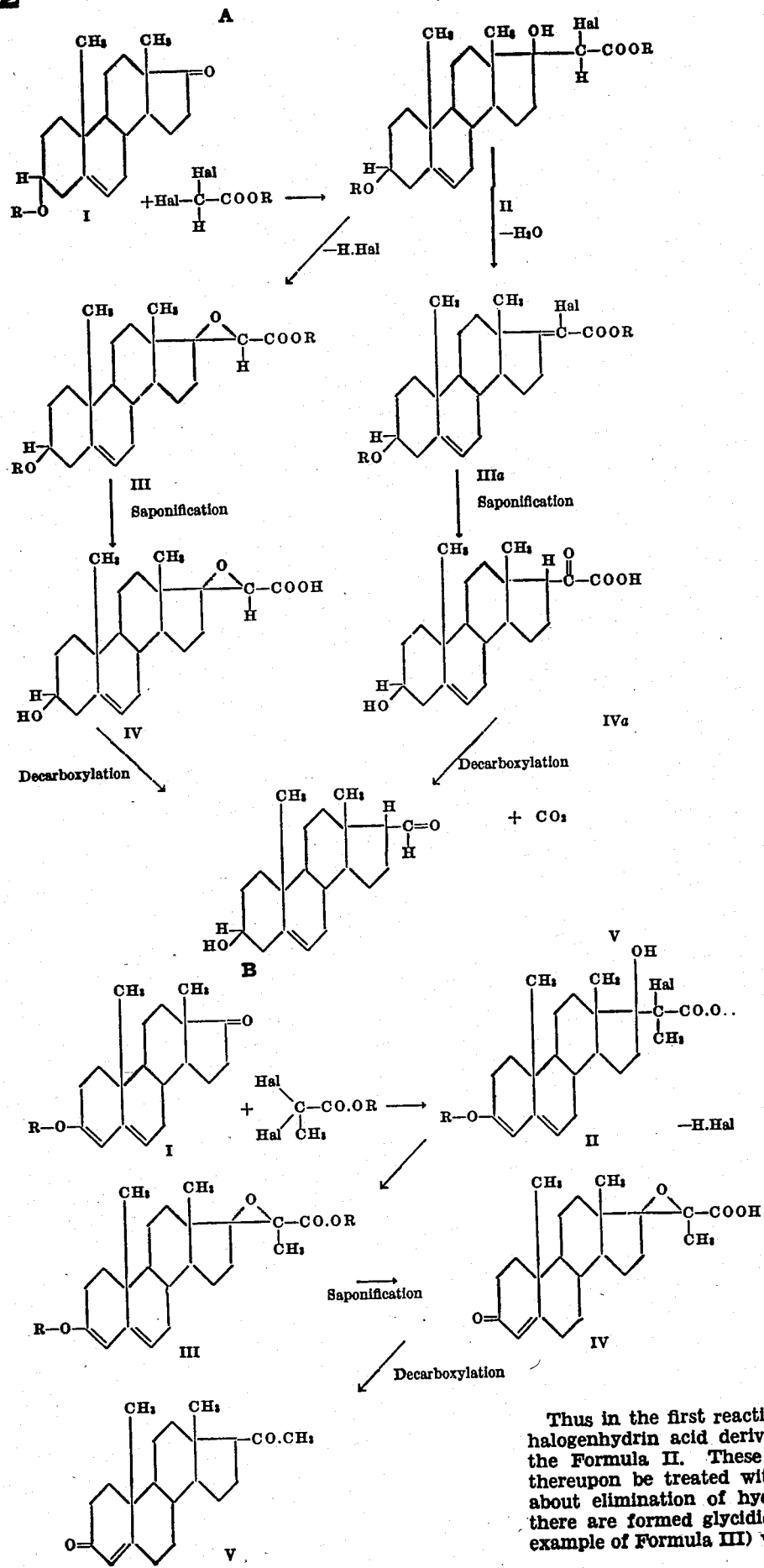
Thus in the first reaction there are produced halogenhydrin acid derivatives, for example of the Formula II. These acid derivatives may thereupon be treated with agents which bring about elimination of hydrogen halide whereby there are formed glycidic acid derivatives (for example of Formula III) which pass into glycidic acids (for example of Formula IV) when treated with saponifying agents, for example an alcoholic alkali solution or an acid. The elimination of hydrogen halide may of course be combined with the saponification.

Also agents which split off water, for example a mineral acid, an acid anhydride or halide such as phosphorus pentoxide or thionyl chloride, an acid or neutral salt such as bisulfate or zinc chloride or the like may be caused to act on the halogenhydrin acid derivatives obtained by condensation with dihalogen acetic acid derivatives. There are thus obtained $\alpha:\beta$-unsaturated $\alpha$-halogen carboxylic acid derivatives of the type of Formula IIIa and these can be converted likewise into free carboxylic acids (apparently $\alpha$-ketocarboxylic acids IVa) by treatment with saponifying agents. The agents above mentioned also serve for this saponification but it is usually advantageous to work in two stages by first treating the product with a salt of an organic acid such as an alkali-acetate or alkalibenzoate and then saponifying the ester so obtained. The removal of water from and the saponification of the unsaturated halogen carboxylic acid derivative may also be combined into one operation.

The elimination of hydrogen halide or water from the chlorhydrin acid derivative and the saponification to produce the 20-oxo-compound may either occur in one stage, for example by the action of boiling alcoholic alkali, or in several stages, for example by treatment first with cold alcoholic alkali and then with hot alcoholic alkali or with an acid.

Hydrogen halide may also be split off for example by the action of an organic base, advantageously a tertiary base. If an ether of a hydroxyketone has been used as the parent material saponification is advantageously brought about by means of an acid.

The chlorohydrin acid derivative may also be caused to react with salts of an organic acid, for example potassium acetate, sodium benzoate, and the like. Thus an $\alpha.\beta$-dihydroxy carboxylic acid derivative is obtained which, when saponified, is converted into an $\alpha.\beta$-dihydroxy acid, from which a glycidic acid or an $\alpha$-keto-acid can be prepared by separating water.

The free carboxylic acids are best decarboxylated by heating, advantageously in the presence of an organic base, especially a tertiary base such as quinoline, quinaldine and the like, or of an acid for example butyric acid, in the presence of a catalyst for example copper or a copper salt, and/or under reduced pressure. In some cases carbon dioxide is already eliminated by energetic action of the saponifying agent.

The mode of carrying out this decarboxylation as well as the solvent used therefor, if any, determine to a great extent the proportion of the isomeric forms of the 20-oxo compounds resulting thereby. If, for example, the acid of the formula

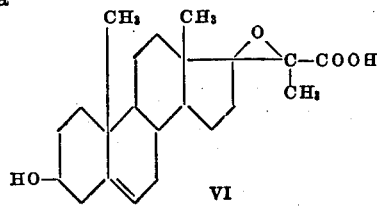

obtained from an ether or ester of the dehydroandrosterone and an $\alpha.\alpha$-dichloropropionic acid derivative is heated together with a dimethyl-aniline, the reaction product consists preferably of the known $\Delta^5$-pregnenolone. If instead of the dimethyl-aniline quinoline is used, nearly exclusively a new isomeric pregnenolone is obtained which is not identical with the known iso-pregnenolone.

The intermediate products and final products obtainable in accordance with the invention are in part compounds of therapeutic value or they are useful for the preparation of such compounds.

The following examples illustrate the invention, the parts being by weight:

*Example 1*

2.5 parts of magnesium are amalgamated with the aid of heat with 250 parts of mercury in a current of hydrogen. After cooling a solution of 6.6 parts of trans-dehydroandrosterone acetate in 125 parts of absolute ether is added and 17.5 parts of $\alpha.\alpha$-dichloropropionic acid ethyl ester are added slowly drop by drop whilst stirring and cooling with ice. The amalgam decomposes and a white precipitate separates. When the main reaction is over the whole is heated to boiling for 1 hour longer in a reflux apparatus. The reaction mixture is decomposed with ice-water and hydrochloric acid and the ethereal layer is separated and dried. After the ether has been evaporated the residue is treated with steam whereby an easily volatile oil distils. The residue may be dissolved in methanol and the solution is cooled whereby the chlorhydrin ester separates. When recrystallized from acetone it has the melting point 162–163° C. By heating the ester with half its weight of sodium hydroxide dissolved in alcohol for a short time in a reflux apparatus hydrogen chloride is split off and simultaneously the glycidic ester formed is saponified. The saponification solution is diluted with water, extracted with ether in order to remove non-acid constituents and then acidified. The crude acid thus precipitated is filtered with suction, washed with water and ether and recrystallized from dioxane. There is obtained a fine crystalline powder of melting point 186–187° C. which according to analysis is $\Delta^{5:6}$-3-hydroxy-pregnene-17:20-oxide-20-carboxylic acid corresponding with Formula VI. 1 part of the acid is heated with 5 parts of quinoline for 10 minutes at 180–200° C. whereby it loses carbon dioxide. The cooled reaction product is mixed with an excess of hydrochloric acid and the whole is extracted with ether. After evaporation of the ether there remains a yellowish crystalline powder which is recrystallized from alcohol of 60 per cent strength. There is thus obtained a product of melting point 193–194° C. and $[\alpha]_D = -22°$. the acetate of which melts at 144° C. and shows an optical rotation of $-27.5°$ C. This product comprises a new $\Delta^{5,6}$-3-hydroxy-pregnene-20-one, which is called neo-pregnenolone and which is levorotary, having a $[\alpha]_D = -124°$ and a melting point of 223–224° C., in addition to the known pregnenolone which is dextrorotary having a $[\alpha]_D = +28.2°$ and a melting point of 192–193° C. If the decarboxylation is carried out in dialkyl aniline, a greater proportion of the latter is produced.

In an analogous manner pregnanol-(3)-ones-(20) are obtained from the corresponding 3-acyloxy-17-hydroxy-20-chloropregnane-20-carboxylic acid esters by using as parent material, for example, esters of the androsterone series.

*Example 2*

If dichloro- or dibromo-acetic acid ester is used in Example 1 instead of dichloropropionic ester there is obtained after condensation the 3-acetate of $\Delta^{5:6}$-androstene-3:17-diol-20-chloro-20-carboxylic acid ester of melting point 170–175° C. (Formula IIA). On treatment with sodium hydroxide this product is converted with saponification and loss of hydrogen chloride into a glycidic acid which on heating loses carbon dioxide and yields a mixture of isomeric $\Delta^{5:6}$-pregnene-3-ol-20-aldehydes. From androsterone esters or ethers epipregnane-3-ol-20-aldehydes are obtained in an analogous manner.

Example 3

1.25 parts of magnesium are amalgamated with 75 parts of mercury and caused to react under 75 parts of benzene with 3.5 parts of $\Delta^{4:5}$-androstene-3:17-dione-3-enol-benzoate and 13 parts of $\alpha.\alpha$-dibromopropionic acid ethyl ester. The whole is heated for several hours to complete the reaction. By working up in a manner analogous to that described in Example 1 there is obtained the chlor-hydrin ester of the enol-benzoate (Formula IIB) which on treatment with alkalies yields a 3-keto-glycidic acid, hydrogen chloride, alcohol and benzoic acid being split off. On heating this glycidic acid it loses carbon dioxide and is converted into a product of melting point 208–209° C. containing a new $\Delta^{4:5}$-pregnene-3:20-dione, called neo-progesterone.

Instead of the enol-benzoate there may be used an enol-ether of $\Delta^{4:5}$-androstene-3:17-dione, for example the 3-trityl-enol-ether, or the free $\Delta^4$-androstene-3:17-dione itself.

Instead of $\alpha.\alpha$-dibromopropionic acid ethyl ester there may be used as reaction component for example an $\alpha.\alpha$-dihalogen-$\beta$-acyloxy-propionic acid ester.

Instead of an ester of the $\alpha.\alpha$-dihalogen carboxylic acid there may be used an amide of this acid or the corresponding nitrile.

Example 4

33 parts of $\alpha.\alpha$-dibromophenylacetic acid ethyl ester are caused to react in ether with 6.5 parts of zinc. After formation of the organo-metallic compound 4 parts of trans-androsterone-benzoate are added and the whole is heated for a long time on the water bath. The bromhydrin ester obtained on working up is converted by the action of boiling alcoholic caustic soda solution into the glycidic acid which on heating loses carbon dioxide and passes into 3-hydroxy-androstanyl-17-phenyl-ketone.

What we claim is:

1. The cyclopentano-polyhydrophenanthrenes containing in the 17-position a hydroxyl group and the group of the formula

wherein X represents a member of the group consisting of COOR, CONH$_2$ and CN, R standing for an alkyl radical.

2. The cyclopentano-polyhydrophenanthrenes containing in the 3-position an acyloxy group and in the 17-position a hydroxyl group and the group of the formula

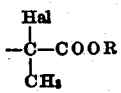

wherein R stands for an alkyl radical.

3. The compounds of the formula

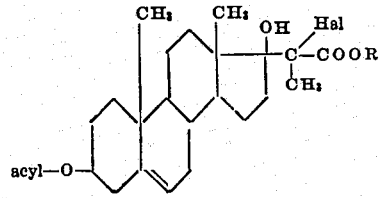

wherein R stands for an alkyl radical.

4. The mixture of $\Delta^{5:6}$-pregnenol-(3)-ones-(20) obtainable by splitting off hydrogen halide, saponifying and decarboxylating the $\Delta^{5:6}$-3-acyloxy-17-hydroxy-20-halogen-pregnene-20-carboxylic acid esters.

5. The $\Delta^{5:6}$-neo-pregnenol-(3)-one-(20) of the formula

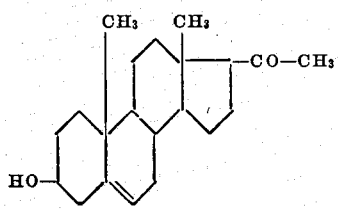

which is a levorotary isomer of the known dextrorotary $\Delta^{5,6}$-pregnenol-3-one-20 and has a specific index of optical rotation $[\alpha]_D = -124°$.

6. The process for the manufacture of cyclopentanopolyhydrophenanthrene-derivatives comprising reacting a 17-ketone of the cyclopentanopolyhydrophenanthrene series with a member of the group of $\alpha.\alpha$-dihalogen carboxylic acid-esters, -amides and -nitriles in presence of a metal of the group consisting of magnesium and zinc.

7. The process for the manufacture of cyclopentanopolyhydrophenanthrene-derivatives comprising reacting a 3-acyloxy-17-ketone of the cyclopentano-polyhydrophenanthrene series with an $\alpha.\alpha$-dihalogen-propionic acid ester in presence of magnesium.

8. The process for the manufacture of cyclopentanopolyhydrophenanthrene-derivatives comprising reacting a $\Delta^{5:6}$-dehydro-androsterone-3-acylate with an $\alpha.\alpha$-dihalogen-propionic acid ester in presence of amalgamated magnesium.

9. The process for the manufacture of cyclopentanopolyhydrophenanthrene-derivatives comprising reacting a $\Delta^{5:6}$-dehydro-androsterone-3-acylate with an $\alpha.\alpha$-dihalogen-propionic acid ester in presence of amalgamated magnesium, splitting off hydrogen-halide, saponifying and decarboxylating the carboxylic acid thus obtained.

10. The process for the manufacture of cyclopentanopolyhydrophenanthrene-derivatives comprising reacting a $\Delta^{5:6}$-dehydro-androsterone-3-acylate with an $\alpha.\alpha$-dihalogen-propionic acid ester in presence of amalgamated magnesium, splitting off hydrogen-halide, saponifying and decarboxylating the carboxylic acid thus obtained in the presence of quinoline.

11. The process for the manufacture of cyclopentanopolyhydrophenanthrene derivatives comprising reacting a $\Delta^{5:6}$-dehydroandrosterone-3-acylate with an $\alpha.\alpha$-dihalogen-propionic acid ester in presence of amalgamated magnesium, splitting off hydrogen-halide, saponifying and decarboxylating the carboxylic acid thus obtained in the presence of a dialkyl aniline.

RUPERT OPPENAUER.
HANS KAEGI.
KARL MIESCHER.